United States Patent
Ramalingam

(12) 
(10) Patent No.: US 6,636,866 B1
(45) Date of Patent: Oct. 21, 2003

(54) SYSTEM AND METHOD FOR OBJECT REPRESENTATION IN AN OBJECT-ORIENTED PROGRAMMING LANGUAGE

(75) Inventor: Ganesan Ramalingam, Cronton On Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 09/629,833

(22) Filed: Jul. 31, 2000

(51) Int. Cl.[7] .............................................. G06F 17/30
(52) U.S. Cl. ................................. 707/103 R; 707/101
(58) Field of Search ................................. 707/101, 102, 707/103, 206; 709/312; 711/152; 716/18

(56) References Cited

U.S. PATENT DOCUMENTS

| | | | | |
|---|---|---|---|---|
| 5,075,848 A | * | 12/1991 | Lai et al. | .................... 711/152 |
| 5,485,613 A | * | 1/1996 | Engelstad et al. | .......... 709/312 |
| 5,535,390 A | * | 7/1996 | Hildebrandt | ................ 707/101 |
| 6,253,226 B1 | * | 6/2001 | Chidambaran et al. | ..... 707/101 |
| 6,467,075 B1 | * | 10/2002 | Sato et al. | .................... 716/18 |

* cited by examiner

Primary Examiner—Charles Rones
Assistant Examiner—Yicun Wu
(74) Attorney, Agent, or Firm—Richard M. Ludwin, Esq.; McGinn & Gibb, PLLC

(57) ABSTRACT

A method and system for optimizing the representation of objects in an object-oriented programming language to reduce the memory requirement during the execution of the program, includes identifying the lifetimes of the various members of objects belonging to various classes. Next, the method uses the lifetime information to generate representations of objects belonging to these collections. Memory requirements are optimized by having members which do not have overlapping lifetimes share the same memory location.

18 Claims, 4 Drawing Sheets

SYSTEM AND METHOD FOR OBJECT REPRESENTATION IN AN OBJECT-ORIENTED PROGRAMMING LANGUAGE

BACKGROUND OF THE INVENTION

Field of the Invention

The present invention relates to the implementation of a computer programming language, and, in particular, the implementation of an object-oriented programming language.

Description of the Related Art

Object-oriented programming languages use classes to describe objects created by the program during execution. Two examples of object-oriented programming languages are Java and C++.

In Java, a class consists of a set of data members. For example, a Java class declaration is in the form:

```
class X {
    int a;
    int b;
    int c;
    int d;
};
```

Class X has four data members, named a, b, c, and d. The execution of a program that contains this class declaration may create a number of instances of this class, also referred to as objects of type X.

The computer executing the program will allocate memory for each object. Eventually, the memory allocated for the created objects may be reclaimed through the "garbage collection process," when the objects are no longer used by the program. The garbage collection process clears the objects from memory whereby the once allocated memory is now available for use. In other languages without garbage collection, such as C++, unnecessary objects must be explicitly freed or deallocated.

An important component of implementing a computer programming language is selecting a suitable representation of objects, which includes determining how much memory must be allocated for an object of a class and determining where every member of a class will be located. In a straight forward implementation of the language, every object of type X that is created will have the four data members, namely a, b, c, and d. If an integer member is 4 bytes long, for example, an object of type X will use 16 bytes for the data members.

In addition, the object may require more bytes for other purposes. One other such purpose may be for storing a pointer to the description of the class to which it belongs.

For simplicity, defined herein, the size of an object refers to the size (i.e. bytes of memory) required for the data members of the objects.

In conventional object-oriented programming languages, a specific amount of memory (i.e. number of byes) is allocated for each object based on the number of members in each class. The specific amount of memory is allocated regardless of whether the various members which comprise a class are ever used. For example, if a specific member of a class is never used, the program will still allocate the same amount of memory as if the member were used. Consequently, memory is wasted (i.e. not available for use) by the allocation (i.e reservation) of memory for the member never used.

Certain optimized implementations, such as the ones described by Tip et al. (Frank Tip, Jong-Deok Choi, John Field, G. Ramalingam, Slicing class hierarchies in C++, in Proceedings of the Eleventh Annual Conference on Object Oriented Programming Systems, Languages, and Applications, 1996, pp. 179–197), as well as Tip and Sweeney (Frank Tip and Peter Sweeney, Class hierarchy specialization, in Proceedings of the Twelfth Annual Conference on Object Oriented Programming Systems, Languages, and Applications, 1997, pp. 271–285), might eliminate some unused data members from the representation.

For example, if an analysis of the program indicates that the data member "c" of objects of type X is never used, then data member "c" can be eliminated from all objects of type X. Consequently, removing member "c" can reduce the size of an object of type X from 16 to 12 bytes. The method described by Tip et al. performs this kind of optimization.

However, if the data member "c" of some objects of type X is used, and the data member "c" of other objects of type X is unused, Tip and Sweeney generate two specialized versions of class X. One first specialized version of class X is for the first collection of objects of type X for which the data member "c" is used. A second specialized version of type x is for a second collection of objects of type X for which the data member "c" is unused. The data member "c" can then be eliminated from the representation of members of the second collection of objects.

While these two methods described by Tip et al. and Tip and Sweeney address the situation when a member of an object is never used, these methods fail to optimize a situation in which various members are used only for part of the lifetime of an object.

For example, often a program has multiple phases Data members "a" and "b" of objects of type X might be used only during phase 1 of the program, while data members "c" and "d" might be used only during phase 2 of the program. The earlier optimizations are not applicable in such a situation because all four members of objects of type X are used. Consequently, no member can be eliminated from the representation of objects of type X.

Thus, the conventional methods fail to provide an optimization method of implementation of objects exploiting the fact that the members of an object are not all in use through out the lifetime of the object.

SUMMARY OF THE INVENTION

It is, therefore, an object of the present invention to provide a method and system for optimizing the implementation of objects in which various members representing the object are not all in use throughout the lifetime of the object.

Optimization of the implementation of objects, according to one embodiment, includes statically identifying various collections of objects that may be created during program execution and identifying the lifetimes of the various members of objects belonging to these collections. A second step includes using the lifetime information to generate representations of objects belonging to these collections. Memory requirements are optimized by having members which do not have overlapping lifetimes, share the same memory location.

In addition, the present invention optimizes implementation of objects by breaking objects into multiple fragments.

In one embodiment, implementation of an object is represented by several different blocks of memory rather than a single contiguous block of memory as is the case when implementing an object using a conventional method. The various blocks contain a subsets of members that represent an object. Each block of memory used to represent an object is an "object fragment." Blocks of memory may be allocated and freed independent of the other blocks. As a result, the amount of memory required to represent an object may increase or decrease during the lifetime of the object, as the set of members of the object that are alive changes during program execution.

The invention, in one form thereof, is a method for processing an object-oriented program having objects belonging to a plurality of classes. Each of the plurality of classes have a plurality of members. The method includes identifying a lifetime associated with one or more members of said plurality of members and identifying a set of members in one of the plurality of classes such that no two members in the said set of members have overlapping lifetimes. In one further embodiment, each member of the said set of members is located at the same offset within objects belonging to the one class.

The invention, in another form thereof, is a system for processing an object-oriented program having objects belonging to a plurality of classes. Each of the plurality of classes have a plurality of members. The system includes means for identifying a lifetime associated with one or more members of the plurality of members and identifying a set of members in one of said plurality of classes such that no two members in the set of members have overlapping lifetimes In one further embodiment, each member of the set of members is located at the same offset within objects belonging to the one class.

The invention, in another form thereof, is a system for processing an object-oriented program having objects belonging to a plurality of classes. Each class of the plurality of classes have a plurality of members. The system includes a machine readable recording medium comprising a program for identifying a set of members in one said plurality of classes such that no two members in said set have overlapping lifetimes. In a further embodiment, the program includes creating a representation for objects belonging to the one class in which members of the set of members are located at the same offset within the objects.

The invention, in yet another form thereof, is a system for processing an object-oriented program having objects belonging to a plurality of classes. Each of the plurality of classes have a plurality of members. The system has a memory device containing executable instructions. The executable instructions includes identifying a lifetime associated with one or more members of said plurality of members and identifying a set of members in one of said plurality of classes such that no two members in the said set of members have overlapping lifetimes. In one further embodiment, each member of the said set of members is located at the same offset within objects belonging to said one class.

The invention, in another form thereof, is a method for processing an object-oriented program having a plurality of classes with a plurality of members belonging to each respective class of the plurality of classes. The method includes identifying a set of members in one of said plurality of classes and identifying a lifetime of the set of identified members, wherein the lifetime of the set of members identifies a start point and an end point in the program. The identified members are removed from the one class and a supplemental class is created comprising the identified members. A map data structure is initialized which associates each object of the one class with an object in the supplemental class.

The invention, in yet another form thereof, is a system for processing an object-oriented program having a plurality of classes and having members belonging to each respective class of the plurality of classes. The system includes means for identifying a set of members in one of the plurality of classes. In addition, the system has means for identifying a lifetime of the set of identified members, wherein the lifetime of the set of members identifies a start point and an end point in the program. Further, there is means for removing the identified members from the one class, and for creating a supplemental class comprising the identified members. The system also includes means for initializing a map data structure which associates each object of the one class with an object in the supplemental class.

The invention, in another form thereof, is a system for processing an object-oriented program having a plurality of classes and having members belonging to each respective class of the plurality of classes. The system has a memory device containing executable instructions. The executable instructions includes identifying a set of members in one of said plurality of classes and identifying a lifetime of the set of identified members, wherein the lifetime of the set of members identifies a start point and an end point in the program. The identified members are removing from the said one class and a supplemental class is created comprising the identified members. A map data structure is initialized which associates each object of the one class with an object in the supplemental class. Further, the invention provides a program storage product for storing a program for executing the above method(s).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
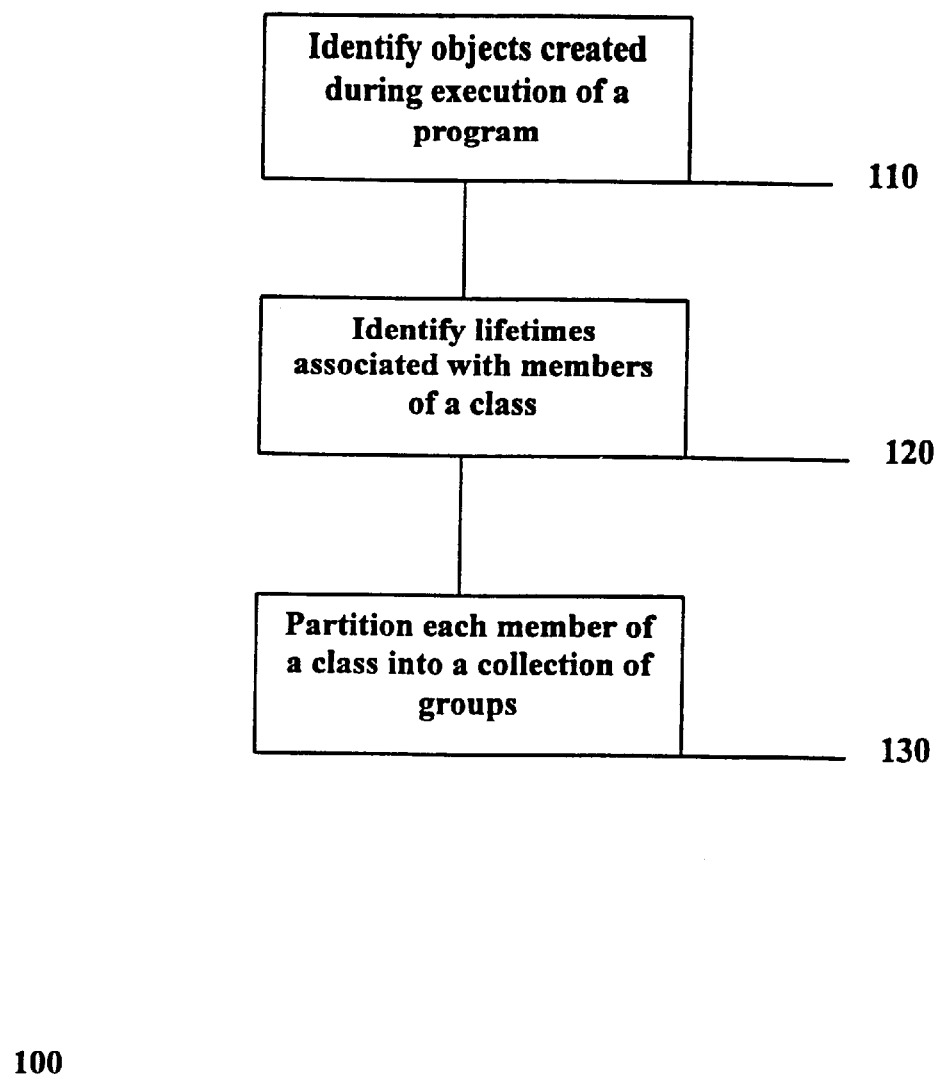
FIG. 1 is a flow diagram illustrating a preferred method 100 of member overlaying optimization according to the present invention.

Referring now to FIG. 1, a method 100 according to an embodiment of the present invention, provides processing of an object-oriented program having objects belonging to a plurality of classes. Each class of the plurality of classes have a plurality of members.

The lifetimes of various members of objects belonging to these classes are identified (Step 110). A set of members, belonging to a single class, that do not have overlapping lifetimes is identified. (Step 120). Memory requirements are optimized by having members which do not have overlapping lifetimes share the same memory location (Step 130).

For example, if data members "a" and "b" of objects of type X are used only during phase 1 of a program while data members "c" and "d" are used only during phase 2 of the program, then data members "a" and "c" have disjoint lifetimes. Members "a" and "c" have disjoint lifetimes since "a" is used only during phase 1 of the program, while "c" is used only during phase 2 of the program. Thus, "a" and "c" can effectively use the same four bytes to represent both members. Similarly, members "b" and "d" have disjoint lifetimes, and can share the same four bytes in an object of type X.

One advantage of using this method is the reduction in the size of each object of type X from 16 bytes to 8 bytes. Consequently, this method optimizes the implementation of an object by reducing the size of allocated memory to represent an object.

Figure 2:
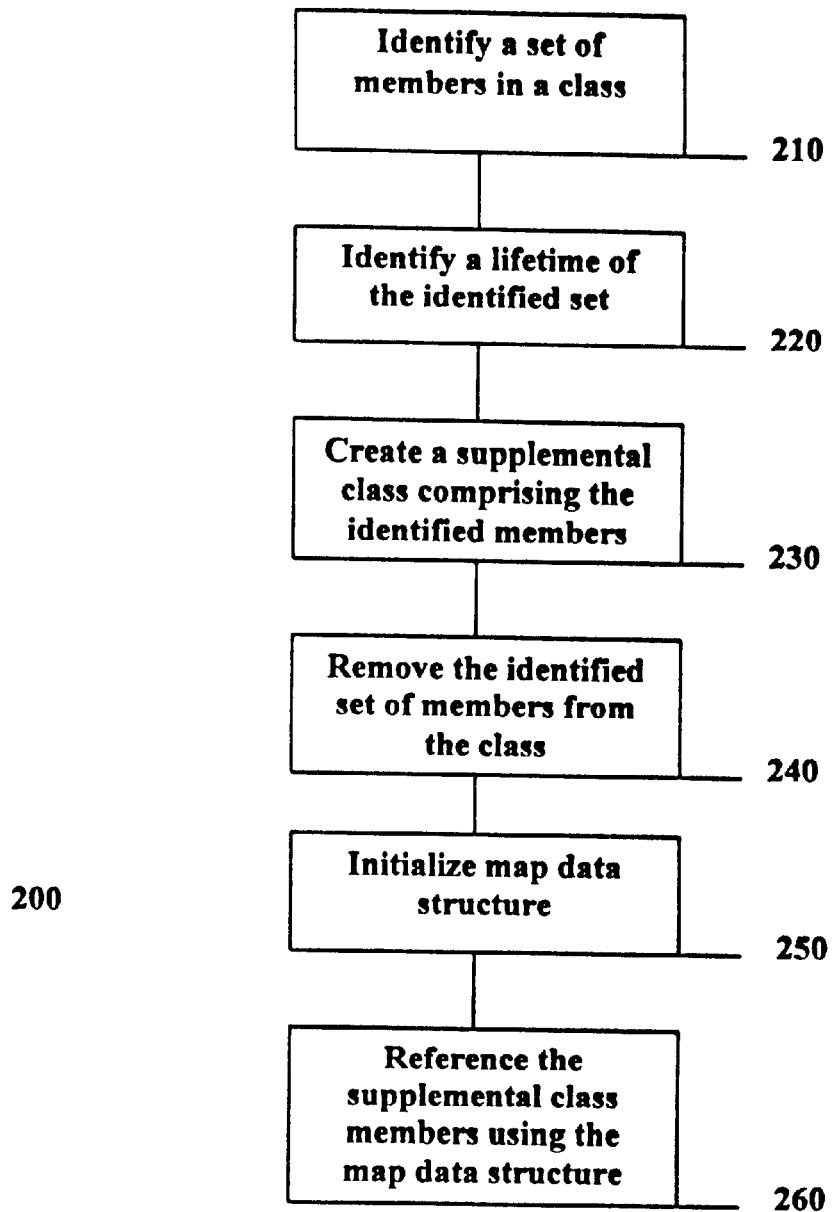
FIG. 2 is a flow diagram illustrating another preferred method 200 of object fragmentation optimization according to the present invention.

Referring now to FIG. 2, a method 200 according to another embodiment of the present invention provides for processing an object-oriented program having a plurality of classes, with each class formed of a plurality of members. Optimization of the implementation of objects proceeds by breaking objects into multiple fragments.

Specifically, implementation occurs by first identifying a set of members in one of the plurality of classes (Step 210). Next, the method 200 identifies a lifetime of the identified set of identified members (Step 220). A supplemental class is created which comprises the set of identified members (Step 230).

The supplemental class defines an object fragment (i.e. a subset of members) which represents a portion of the object. Next, the set of identified members are removed from the class (Step 240).

A suitable data structure (i.e. a map) is used to link the different fragments that make up a single object (Step 250). The map associates every object belonging to the class (called the "domain" of the map) with an object belonging to the supplemental class (called the "range" of the map). As a result, the map is used to reference members of the supplemental class objects in order to represent all members in use which define an object (Step 260). One of ordinary skill in the art will realize that the maps may be implemented in various ways to achieve the objectives of this embodiment of the present invention.

One advantage of the present embodiment is that there is a better utilization of available memory when objects are long-lived but the "object fragments" are short-lived. The present invention is not obligated to allocate a large, continuous block of memory for storing all members over during the lifetime of an object.

A second advantage of this embodiment is that the block of memory used for one object fragment may be allocated and freed independent of the other object fragments. As a result, the amount of memory required to represent an object may increase or decrease during the lifetime of the object, as the set of members of the object that are alive changes during program execution.

The present invention can be implemented as part of a compiler (a translator from one language, e.g. C++, to another, e.g. machine code) or an interpreter (a virtual machine that implements the language). In addition, the present invention may be implemented as part of a source-to-source optimizer that transforms a program in one language to an optimized program in the same language. The implementation algorithm below describes a source-to-source optimizer for C++ as an example to demonstrate how the present invention may be put into practice.

The present invention can be used to identify a suitable implementation of objects of a given type (or class) T. A first optimization, a member overlaying optimization, corresponds to method 100. A second optimization, object fragmentation optimization, corresponds to method 200. In keeping with the spirit of the present invention, one can choose to implement either one or both of the optimizations.

The Member Overlaying Optimization

When implementing member overlaying optimization, the lifetime of the member m is identified for each data member m of class T (Step 110). Next, the members of class T are partitioned into a collection of groups such that no two members in a given group have overlapping lifetimes (Step 120). Then, a representation of objects of class T is created in which all members of a group overlay each other (Step 130).

In a source-to-source optimizer, this can be done by modifying the declaration of class T by placing all members of a group into a union. In a compiler, this requires modifying the code generation so that a reference to any member of a group is translated to refer to the same offset within an object.

The Object Fragmentation Optimization

When implementing object fragmentation optimization, the lifetime of member m is identified for each data member m of class T, (Step 210). Next, the members of class T are partitioned into a collection of groups, where members with similar lifetimes are placed together in a group (Step 230). Each of these groups represents an object fragment of T. One of these groups (preferably the one with the longest lifetime) is selected as the primary fragment, and the other fragments are referred to as secondary fragments, z, of T (Step 230).

A new class for each fragment of T, comprising the data members associated with that group, is created (Step 230). An implementation map, $Map_z$, is initialized for each secondary fragment z, linking (i.e mapping) the primary fragment to the secondary fragment z (Step 250). It is preferable to allocate the secondary fragment, z, and initialize its members, the first time there is a reference to a particular secondary fragment during execution of the program (Step 250).

Next, the code is modified so that references to class T are replaced by references to the class corresponding to the primary fragment of class T (Step 240). References to data members belonging to a secondary fragment z of T are modified to first perform a lookup of the map $Map_z$ corresponding to the secondary fragment using the primary fragment, and to then reference the corresponding data member of the secondary fragment (Step 260).

Code is generated to allocate and initialize the corresponding map at the beginning of the lifetime of any secondary fragment (Step 250). The lifetime of a fragment is the union of the lifetimes of the members belonging to that fragment.

In addition, code is generated to deallocate the corresponding map at the ending of the lifetime of any secondary fragment. One of ordinary skill in the art would recognize that in a system without garbage collection, deallocation would involve invoking the appropriate memory-management procedure to free the memory allocated for the map. Conversely, in a garbage-collected system, deallocation involves removing references to the map and the secondary fragments by assigning a "NULL" value to the appropriate variables. This causes the memory allocated to the map and the secondary fragments to become "garbage" and eventually collected (i.e. re-captured).

The present invention chooses an implementation for objects based on an analysis of the way the objects are used in an object-oriented program. In one, general, form of the present invention, the same implementation is chosen for all objects of a given type C.

In a further, more specialized embodiment, different implementations can be chosen for different objects of the same type C. In such an embodiment, all objects of a type C are partitioned into a set of collections $C_1, C_2, \ldots C_k$. Next an implementation mechanism is chosen for each collection $C_i$. One of ordinary skill in the art would know how to modify the methods described here to generate a different representation for each collection $C_i$.

In order to implement the member overlaying optimization method according to the present invention, the program identifies which members have disjoint lifetimes and which members have overlapping lifetimes (Step 120). It is not necessary to determine (i.e. identify) the actual lifetimes. Conversely, it is useful to have the lifetime information for the second optimization we have outlined. (Step 220).

As described below, a member m is the member m of each object in the given collection $C_i$. Similarly, the lifetime of the member m, is the joint lifetime of the member m of each object in the given collection. The notation $C_i::m$ is used to explicitly describe this relationship.

A statement in a program is a definition of $C_i::m$ if the statement assigns a value to the member m of some object in the collection $C_i$. A statement is a use of $C_i::m$ if the statement contains a reference to the member of some object in the collection $C_i$. A path in the program kills a member $C_i::m$ if the program contains an assignment to the member m of each object in the collection $C_i$.

A path from a definition d of a member $C_i::m$, to a use u of $C_i::m$ defines a live path for $C_i::m$ if the path does not kill $C_i::m$. The member $C_i::m$ is live at a program point (e.g. an edge), if the program point (e.g. edge) occurs in a live path for $C_i::m$.

Members with overlaying members with disjoint lifetimes are determined (Steps 120, 220) Two members have disjoint lifetimes if there is no program point where both members are both live. This is but one way to identify members with disjoint lifetimes. More sophisticated and precise ways may be employed to identify members with disjoint lifetimes. For example, two members have overlapping lifetimes, if and only if, one of the members is live at a definition or use of the other. This characterization can be used to identify members with disjoint lifetimes more precisely.

Once the lifetime overlap information is identified for all members of a given collection of objects, suitable representations are created for the objects of the collection. One technique that can be used to determine the set of members that should overlay each other is the graph coloring technique.

In the present invention, a graph comprising a vertex for every member is created. In addition, an edge is added between any two members that have overlapping lifetimes. Next, graph coloring algorithms (e.g., see Gregory Chaitin, "Register allocation and spilling via graph coloring," in *Proceedings of the ACM SIGPLAN Symposium on Compiler Construction*, 1982, pp. 98–105) can then be used to assign a color for every vertex in the graph such that no two adjacent vertices are assigned the same color. As a result, all vertices which are assigned the same color can be overlaid with each other.

Contrary to conventional graph coloring techniques which have previously been used for purposes such as register allocation, the present invention modifies graph coloring techniques for purposes of identifying suitable representations for a collection of objects for which memory is allocated on a heap.

The lifetime of a member $C_i::m$ is a set of all program points where the member is alive. For implementing the object fragmentation optimization embodiment of the present invention, a pair of program points that "enclose" the lifetime of the member is identified (Step 220). A first program point identifies the beginning of the lifetime, and a second program point identifies the end of the lifetime (Step 220).

After the beginning and ending of the lifetime of a member $C_i::m$ are identified, it is now possible to "break away" member m away from each object in $C_i$ as an "object fragment" (Step 240). In particular, the representation of member m is eliminated (i.e. omitted) from the objects belonging to $C_i$ (Step 240) The resulting representation of an object is referred to as the object's "core." Thus, an object core represents an object, but may not contain all the members of the full object.

A map from object cores to object fragments is allocated at the beginning of the lifetime of the fragment. The map is deallocated at the end of the lifetime of the fragment.

Using the map, any reference to the fragmented member m of an object o is translated between the object core and the object fragment (Step 260). First, the map is used to find the fragment corresponding to the object (core) o that contains the member m. Next, the member from within the object fragment is referenced (Step 260).

A suitable pair of program points that encloses the lifetime of $C_i::m$ can be found using various graph theoretic algorithms. For example, the concept of a single-entry, single-exit, region may be used. Various algorithms may be employed for identifying the various single-entry single-exit regions in a program, as well as the nesting relation between them.

For example, a single-entry single-exit region (or SESE region) covers a member $C_i::m$ if the region includes every vertex and every edge where $C_i::m$ is alive. In other words, the region covers a set of points in the program where the given member $C_i::m$ is alive. In one form of the present invention, a SESE region that covers a given member $C_i::m$ is designated as the lifetime of the given member $C_i::m$. Preferably, a program structure tree (e.g., see Richard Johnson, Efficient program analysis using dependence flow graphs, Ph.D. thesis, Cornell University, 1994) is used to identify the smallest SESE region that covers a given member $C_i::m$, and designate this smallest SESE region as the lifetime of the given member $C_i::m$.

A member may be used for different purposes in different parts of the program. In addition, the member may have several disjoint lifetimes. In such a case, it is beneficial to represent each set of disjoint lifetimes by a separate single-entry single-exit region. Thus, a separate map can be used for each of these distinct lifetimes to implement the corresponding member.

Several methods may be employed to fragment the objects belonging to a collection $C_i$. Breaking each member into a separate fragment provides the maximum flexibility. However, each fragment adds some overhead to the system. In particular, each fragment requires a separate map, which results in consumption of memory. Therefore, it may be advantageous to group several members into a single fragment.

When several members are grouped together into a fragment, the resulting fragment will have a lifetime that is at least as long as the lifetimes of each member in the fragment. To the extent that the lifetime of the fragment exceeds the lifetime of a member in the fragment, some potential savings in memory is sacrificed. Hence, it is advantageous to group together members which have similar lifetimes.

A Program Structure Tree can be used to select groups of members with similar lifetimes. In particular, for each single-entry single-exit region in the Program Structure Tree, the set of members which it covers can be identified. The set of members associated with a SESE region defines a candidate for fragmentation.

In addition, suitable fragmentations may be selected using various criteria. For example, depending on the overhead associated with implementing the map data structure, a minimum size for each fragment can be selected. All candidate fragments with a size above the minimum size are then selected.

Alternatively, concept theory (e.g., see Gregor Snelting, "Concept theory—a new framework for program understanding," in *Proceedings of the ACM Workshop on Program Analysis for Software Tools and Engineering*, 1998, pp. 1–10) may be used to identify groups of member with similar lifetimes. The identified groups of members, become candidates for fragmentation.

There are several ways in which maps from a set O to a set R can be implemented. A map from a set O of objects to a set R of objects is essentially a data structure that associates every object in set O with a corresponding object in set R. The map provides an operation called the lookup operation. The lookup operation returns a corresponding object in set R for a given object in set O.

One possible implementation is to store a pointer in every object belonging to O that points to the corresponding object in R. This is a "direct access" map that enables the recovery of the object in R associated with a given object in O in constant time.

As a result, a fast access time is realized. The overhead, in terms of memory consumed, to provide this fast access is the space that the pointer occupies in the object. However, in a simple implementation of such a map, the pointer will be NULL until the map is created. At map creation time, for every object in O, an object of R is allocated and the pointer in O is initialized to point to the newly allocated object. At map deallocation time, all the R objects are deallocated and the pointer in the O objects are set to NULL again. There are several variations possible in the scheme, including allocating R objects on demand (i.e. when and as necessary). In such an implementation, the R object corresponding to an O object is allocated and initialized the first time the lookup operation is performed on the specified O object.

In addition, there are other ways to implement maps as well. For example, if objects in the set O are assigned unique numbers in some range from 1 to k, then an array can be used to efficiently implement the map. Alternatively, maps can be implemented using hash tables.

In languages with garbage collection, map deallocation requires only assigning the NULL value to the appropriate set of variables. The corresponding memory will then become available at the next garbage collection. In languages without garbage collection, the appropriate deallocation procedure should be called for these variables before they are set to NULL.

In some conventional object-oriented languages, members of objects are initialized when the objects are created, even though the members are used much later. As a result, there will be an increase the lifetimes of members to accommodate a lifetime which starts at object creation rather than when the member is first used. As a result, such conventional object-oriented languages reduce the effectiveness of the present optimization methods of the embodiments of the present invention described above.

However, in a further embodiment, the member-initialization is moved to a point closer to the actual use of the member. For example, the member-initialization can be effectively moved to a point closer to its actual use for members that are initialized to a constant value at object creation time. As a result, there is a reduction in the member's lifetime. Consequently, there is an improvement in the effectiveness of the present optimizations.

Further, for example, $C_i$ is a collection of objects and m is a member of collection $C_i$ that is initialized to a constant value, c. It is only necessary to monitor assignments in the program which may assign values other than c to this member.

The definitions of member $C_i$::m are partitioned into two sets,. One set is a $DEFS_{const}$ of definitions that always assign the constant value c. A second set, $DEFS_{var}$ of definitions may assign a value other than c.

As described above, a live path for $C_i$::m is a path from a definition of $C_i$::m to a use of $C_i$::m along which the member is not killed. A live path is a variant live path for $C_i$::m if the definition at the beginning of the path belongs to $DEFS_{var}$. $C_i$::m is "variably alive" at a program point if the program point occurs in a variant live path.

If $C_i$::m is live but not variably live at a program point, then the only definitions reaching that program point assign the constant value c. Hence, any reference of $C_i$::m at that point can be replaced by a reference to the constant c. The "variable lifetime" of $C_i$::m consists of the set of all points where $C_i$::m is variably alive.

Now, it is possible to use the variable lifetime of $C_i$::m in place of its lifetime. The primary difference now is that the initial map must be created with a default value of c.

EXAMPLE I

Below is a sample program illustrated the implementation of the present invention.

```
/* Program point p0 */
Create a collection of objects C, initializing obj.d to 0 for every object obj
in C ;
/* Program point p1 */
for every object obj in C do
    obj.a.:=...;   /* definition of member C::a */
end for
/* Program point p2 */
for every object obj in C do
    := obj.a;      /* use of member C::a*/
end for
/* Program point p3 */
for every object obj in C do
    obj.b:=...;    /* definition of member C::b */
    obj.c:=...;    /* definition of member C::c */
end for
/* Program point p4*/
for every object obj in C do
    := obj.b;      /* use of member C::b */
    := obj.c;      /* use of member C::c */
end for
/* Program point p5 */
for every object obj in C do
```

-continued

```
    obj.a:=...;   /* definition of member C::a */
    if (...) then obj d:=...;      /* definition of member C::d */
    obj.e:=...;   /* definition of member C::e */
end for
/* Program point p6 */
for every object obj in C do
        := obj.a;      /* use of member C::a */
        := obj.d;      /* use of member C::d */
        := obj.e;      /* use of member C::e */
end for
/* Program point p7 */
```

The focus of this example is on a single collection of objects C, which is assumed to be created after program point p0. The objects in this collection have 5 members each, named a, b, c, d, and e. Member C::b's lifetime is enclosed by the program points (p3,p5). In other words, member C::b is live only after program point p3 and before program point p5. On the other hand, member C::e has a lifetime (p5,p7). In particular, C::b and C::e have disjoint lifetimes. Hence, C::b and C::e can be overlaid each other.

Member C::c has a lifetime (p3,p5). In particular, member C::b and C::c have overlapping lifetimes. Hence, C::b and C::c cannot be overlaid each other.

The other members illustrate various other aspects of the invention. For example member C::a has two separate lifetimes (p1,p3) and (p5,p7). Sophisticated dependence analysis can establish this by observing that the loop after program point p5 kills the initial definition of C::a in the loop after program point p1. Consequently, different implementations may be used for member C::a in the two different lifetimes. Further, since the lifetime of C::a is actually disjoint from the lifetimes of C::b and C::c, member C::a can actually be overlaid either C::b or C::c.

If less sophisticated dependence analysis is used, the lifetime of member C::a can be estimated to be (p1,p7). It is reasonable to make this estimation as it only decreases the effectiveness of the optimization by preventing the overlaying of C::a with either C::b or C::c.

Member C::d illustrates member initialization optimization of the present invention. This member is initialized to a constant value 0 when the objects are created (after program point p0). However, it is used mostly between program points (p5,p7). In particular, (p5,p7) encloses the variable lifetime of member C::d. Thus, by moving the initialization of member C::d to program point p5, the lifetime of member C::d is shortened, enabling further optimizations.

In object fragmentation optimizations, members C::b and C::c have the same lifetime, namely (p3,p5). Hence, those two members are a good candidate for a fragment (provided the sizes of these two members are large enough to justify the overhead). C::b and C::c could form a fragment, by creating a corresponding map at program point p3, and freeing map at program point p5.

Similarly, members C::a, C::d, and C::e form a good candidate fragment in the lifetime (p5,p7). As described previously, the use of C::a in lifetime (p1,p3) is distinct from the use of C::a in (p5,p7) and can be implemented differently. Here, C::d has a variable lifetime (p5,p7) with an initializing definition outside this lifetime. In this case, the map corresponds to this fragment at program point p5, and the map is initialized to assign member C::d the default value of 0, thus handling the initialization of member C::d.).

While not necessary, it may be advantageous to use both member overlaying optimization and object fragmentation optimization together. Thus, the fragments {C::b,C::c} and {C::a,C::d,C::e} have disjoint lifetimes. Hence, these fragments can be overlaid. If the maps corresponding to these fragments are implemented using a pointer in the actual objects to the corresponding fragments, then the pointers corresponding to these two fragments can be overlaid each other.

Figure 3:
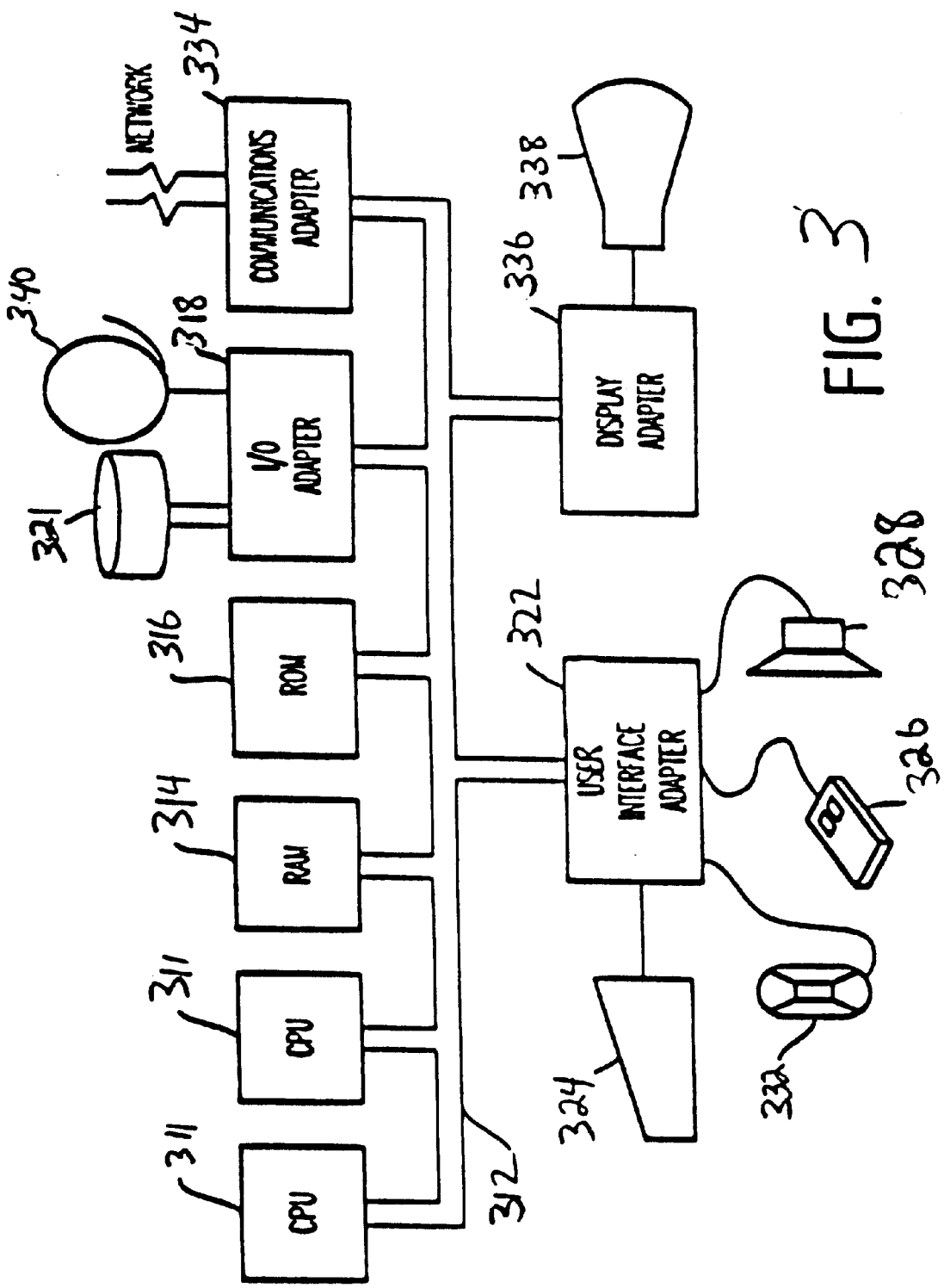
FIG. 3 is a schematic diagram a system for implementing a method of the present invention.

Referring now to FIG. 3, system 300 illustrates a typical hardware configuration of a processing an object-oriented program in accordance with the invention and which preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339. Further, an automated reader/scanner 340 may be included. Such readers/scanners are commercially available from many sources.

In addition to the hardware/software environment described above, a different aspect of the invention includes a computer-implemented method for performing the above method. As an example, this method may be implemented in the particular environment discussed above.

Such a method may be implemented, for example, by operating the CPU 311 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the method of the invention.

Figure 4:
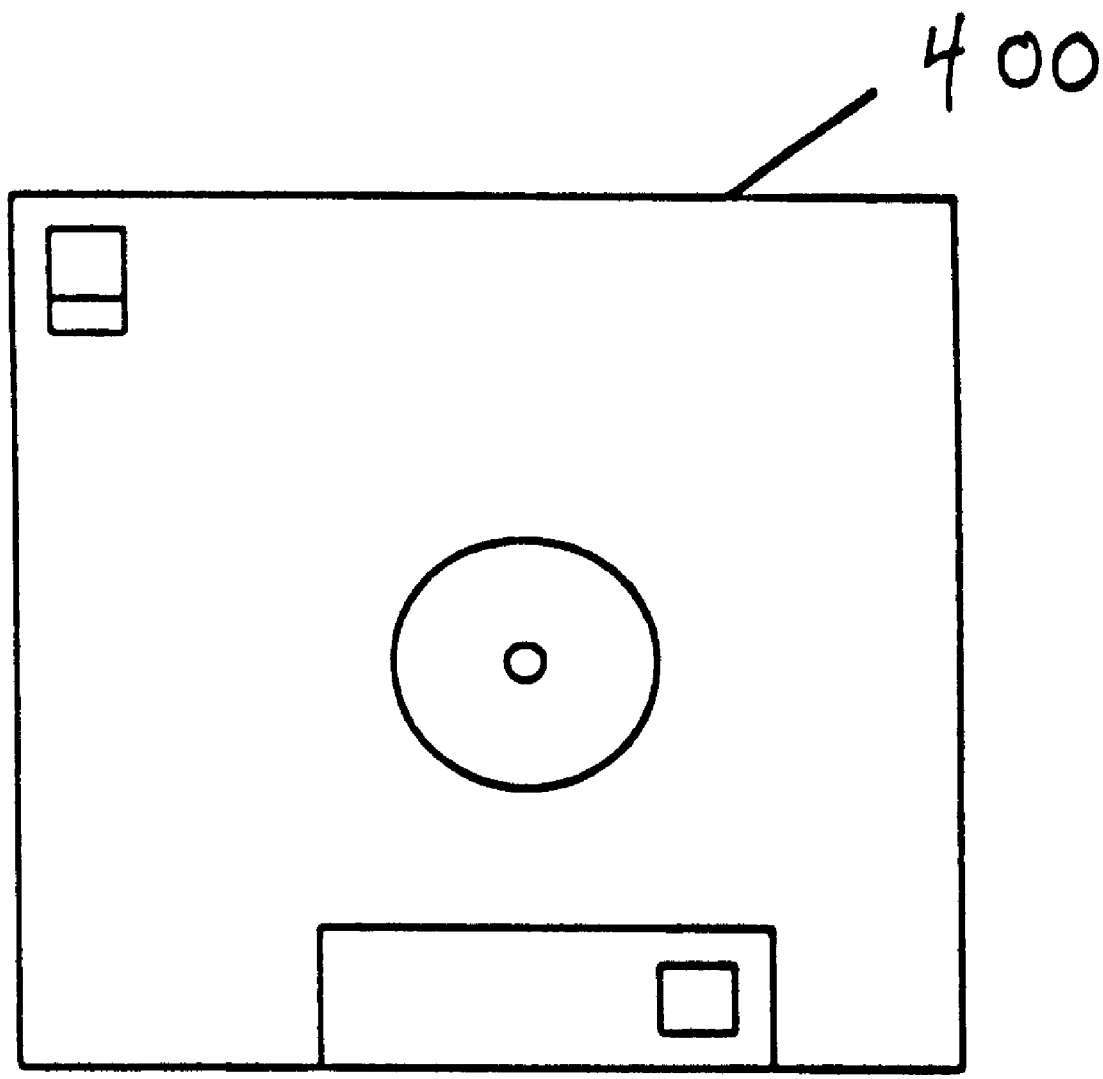
FIG. 4 executable instructions for implementing a method of the present invention.

This signal-bearing media may include, for example, a RAM contained within the CPU 311, as represented by the fast-access storage for example. Alternatively, the instructions may be contained in another signal-bearing media, such as a magnetic data storage diskette 400 (FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C++ etc.

While the invention has been described in terms of preferred embodiments, those skilled in the art will recognize that the invention can be practiced with modification within the spirit and scope of the appended claims.

What is claimed is:

1. A method for processing an object-oriented program having objects belonging to a plurality of classes, each class of said plurality of classes having a plurality of members, the method comprising:
- identifying a member lifetime for each member in said plurality of members;
- identifying a set of members in one class of said plurality of classes such that no two members in said set have overlapping member lifetimes; and
- creating a representation for objects belonging to said one class in which members of said set of members are located at the same offset within said objects.

2. A method for processing an object-oriented program having a plurality of classes, each class of said plurality of classes having a plurality of members, the method comprising:
- identifying a member lifetime for each member in said plurality of members;
- identifying a set of members in one class of said plurality of classes, said set of members comprising members having similar lifetimes;
- identifying a lifetime of said identified set of members, wherein said lifetime of said set of members identifies a start point and an end point in the program;
- creating a supplemental class comprising the identified set of members;
- removing said identified set of members from said class, and
- initializing a map data structure which associates each object of said class with an object in said supplemental class.

3. The method of claim 2, wherein the map data structure is implemented by adding a new member to said class that points to an object of said supplemental class.

4. The method of claim 2, further comprising:
- deallocating the map data structure at the end of said lifetime of said set of identified members.

5. The method of claim 2, further comprising:
- performing a lookup operation on a first object of said class, using said map to identify a second object of said supplemental class, said second object being associated with said first object; and
- retrieving said member from said second object, thereby implementing a reference to one of said set of identified members of said first object.

6. The method of claim 5, further comprising:
- allocating and initializing a third object of said supplemental class and associating said third object with said first object when said lookup operation on said first object does not find an object associated with said first object.

7. A system for processing an object-oriented program having objects belonging to a plurality of classes, each class of said plurality of classes having a plurality of members, comprising:
- means for identifying a member lifetime for each member in said plurality of members;
- means for identifying a set of members in one class of said plurality of classes such that no two members in said set have overlapping lifetimes; and
- means for creating a representation of objects belonging to said one class in which members of said set of members are located at the same offset within said objects.

8. A system for processing an object-oriented program having a plurality of classes, each class of said plurality of classes having a plurality of members, said system comprising:
- a machine readable recording medium comprising a program for identifying a member lifetime for each member in said plurality of members, identifying a set of members in one class of said plurality of classes such that no two members in said set have overlapping lifetimes, and creating a representation for objects belonging to said one class where members of said set of members are located at the same offset within said objects.

9. A system for processing an object-oriented program having a plurality of classes, each class of said plurality of classes having a plurality of members, the system comprising:
- means for identifying a member lifetime for each member in said plurality of members;
- means for identifying a set of members in one of said plurality of classes, said set of members comprising members having similar lifetimes;
- means for identifying a lifetime of said identified set of members, wherein said lifetime of said set of members identifies a start point and an end point in the program;
- means for creating a supplemental class comprising the identified set of members;
- means for removing said identified set of members from said class; and
- means for initializing a map data structure which associates each object of said class with an object in said supplemental class.

10. The system of claim 9, wherein said map data structure is implemented by adding a new member to said class that points to an object of said supplemental class.

11. The system of claim 9, further comprising:
- means for deallocating said map data structure at the end of said lifetime of said set of identified members.

12. The system of claim 9, further comprising:
- means for performing a lookup operation on a first object of said class using said map to identify a second object of said supplemental class, said second object being associated with said first object; and
- means for retrieving said member from said second object, thereby implementing a reference to one of said set of identified members of said first object.

13. The system of claim 12, further comprising:
- means for allocating and initializing a third object of said supplemental class and associating said third object with said first object when said lookup operation on said first object does not find an object associated with said first object.

14. A system for processing an object-oriented program having a plurality of classes, each class of said plurality of classes having members belonging to the classes, said system comprising:
- a machine readable recording medium comprising a program for identifying a member lifetime for each member in said plurality of members, identifying a set of members in one said plurality of classes, said set of members comprising members having similar lifetimes, identifying a lifetime of said identified set of members, wherein said lifetime of said set of members identifies a start point and an end point in the program, creating a supplemental class comprising the identified set of members, removing said identified set of members from said class, and initializing a map data structure which associates each object of said class with an object in said supplemental class.

15. The system of claim 14, wherein the map data structure is implemented by adding a new member to said class that points to an object of said supplemental class.

16. The system of claim 14, wherein said program deallocates the map data structure at the end of said lifetime of said set of identified members.

17. The system of claim 14, wherein said program performs a lookup operation on a first object of said class using said map to identify a second object of said supplemental class, said second object being associated with said first object, and retrieves said member from said second object, thereby implementing a reference to one of said set of identified members of said first object.

18. The system of claim 17, wherein said program further comprises:

allocating and initializing a third object of said supplemental class; and associating said third object with said first object when said lookup operation on said first object does not find an object associated with said first object.

* * * * *